United States Patent [19]

Bailey et al.

[11] 4,037,145
[45] July 19, 1977

[54] MULTIPLE FREQUENCY CHOPPER CONTROL

[75] Inventors: Ronald Barry Bailey; Thomas Detlor Stitt, both of Erie, Pa.

[73] Assignee: General Electric Company, Erie, Pa.

[21] Appl. No.: 638,520

[22] Filed: Dec. 8, 1975

[51] Int. Cl.² .............................................. H02P 5/06
[52] U.S. Cl. ................................. 318/341; 318/345 R; 318/599; 318/332
[58] Field of Search ............... 318/332, 341, 395, 415, 318/416, 345, 318, 599

[56] References Cited

U.S. PATENT DOCUMENTS 3,911,341   10/1975   Carlson et al. ...................... 318/341

Primary Examiner—Robert K. Schaefer
Assistant Examiner—Michael K. Mutter
Attorney, Agent, or Firm—James H. Beusse

[57] ABSTRACT

A method and control system for minimizing peak current levels in a direct current traction motor drive system in which the traction motor is powered by periodic current pulses metered from a direct current source by a controllable switch. The control system includes apparatus for comparing actual motor current to commanded motor current and for controlling the duty factor of the controllable switch in a manner tending to minimize any difference between actual and commanded currents. The control system further includes apparatus for changing the repetition rate of the current pulses in response to the magnitude of current in the motor, without effecting the commanded duty factor of the controllable switch, so that the ripple currents which are inversely related to repetition rate are reduced as average motor current is increased to thereby maintain total peak current levels within predetermined limits.

9 Claims, 1 Drawing Figure

MULTIPLE FREQUENCY CHOPPER CONTROL

The present invention relates to a chopper control system and, more particularly, to a control system for multiple frequency chopper operation.

Performance requirements for electrically propelled vehicles, particularly torque-speed requirements, generally dictate the use of direct current (DC) motors. The DC motors may be any of the well known types of DC motors such as, for example, series wound, compound wound or separately excited. Conventionally the armature winding of the DC motor is energized by direct current controlled by resistors in series circuit arrangement with the motor. By selectively adding or subtracting resistance, the amount of power applied to the motor, and thus the motor performance, may be controlled. As is well known such a control system, although relatively simple, suffers from numerous maladies, the most onerous of which is inefficiency. For this reason "choppers" have been substituted for series resistors in the more recently developed motor control systems.

In a series chopper control system a controllable switch is located between a source of DC power and the motor armature, the controllable switch replacing the previously used resistor control. By cyclically opening and closing the switch, pulses of current are metered to the motor. During periods when the switch is open armature current can continue flowing through a free wheeling diode connected across the armature. The armature windings generally act as a large inductive load and tend to smooth the pulsating current into an average current, which determines motor torque. For lower inductance motors a smoothing reactor is connected in series with the motor. Because the switch is either opened or closed, power consumption is primarily in the energy required to open and close the switch and the energy utilized by the motor, although it should be noted that known switches are not ideal and thus some power is expended in the switch itself.

In the present state-of-the-art chopper control systems, the controllable switch is commonly a thyristor or silicon controlled rectifier (SCR). The SCR is a three-terminal device having anode, cathode and gate terminals. When the SCR is forward biased, i.e. the anode terminal is at a positive potential with respect to the cathode terminal, a current signal applied to the gate terminal will cause the SCR to be gated into conduction and to exhibit a negligible anode to cathode resistance. Once gated or fired in this manner, the SCR can only be turned off by subsequently reducing the current through the device to zero and then applying a reverse bias from anode to cathode for a time period sufficient to allow the SCR to regain its forward voltage blocking ability. In practical applications the SCR can be turned off by means of a "commutation" circuit connected in parallel therewith. A detailed description of SCR devices, chopper circuits and commutation circuits may be had by reference to the SCR Manual, Fifth Edition published in 1972 by the General Electric Company, Semiconductor Products Department, Syracuse, N.Y.

A typical chopper commutation circuit is a "ringing" circuit, i.e., the circuit contains inductive and capacitive components which develop an oscillating or ringing current. A chopper commutation circuit may include, for example, a capacitor, an inductor, several diodes and a commutating SCR. The chopping frequency is determined by the frequency at which the motor-current conducting main SCR and commutating SCR are fired, and the duty factor is determined by the percentage of a period between consecutive firings of the main SCR that has elapsed when the auxiliary SCR is fired.

Each component in the commutating circuit must be sized, or rated, to meet the particular current requirements of the circuit application and also the duty factor of the chopper circuit. The actual rating of each component is dependent upon the total energy expended in the circuit, or more precisely, the rating is a function of the watt-seconds per pulse multiplied by the frequency or number of pulses per second. Since the rating of each of these components determines not only the cost of the commutation circuit but also the weight, efficiency and physical size of the circuit, it is apparent that great attention must be placee on minimizing the requirements of the commutation circuit.

Since the rating of the commutation circuit components is directly proportional to the watt-seconds per pulse applied to that component multiplied by the frequency of the pulses, it is apparent that the required rating can be reduced by lowering the energy in each pulse or by reducing the frequency of the pulses. However, these two factors are not mutually independent. In particular, it is well known in motor applications that for a constant duty factor, where duty factor ($\alpha$) is the ratio of the conduction time of the chopper switch to the total time in one cycle of operation, the ripple current induced in a load as a result of the pulsating source current is inversely proportional to frequency.

More precisely, it is well known that for pulse wave excitation of an inductive load, such as a motor, the amplitude of the ripple currents induced by the excitation is proportional to the time duration of the pulse wave. In mathematical form this relationship can be expressed as $$\Delta I = \frac{E(\Delta t)}{L}$$

where
 $\Delta I$ represents the change in current level,
 $E$ represents the voltage applied to $L$,
 $\Delta t$ represents the time duration of $E$, and
 $L$ represents the inductive reactance of the load.

$\Delta t$ can be expressed in terms of duty factor as follows: $\alpha = \Delta t/T$, where $T$ equals the time period of a complete cycle of load excitation. But since $T = 1/f$, where $f$ equals frequency of excitation, then $\alpha f(\Delta t)$ and $\Delta t = \alpha/f$. Therefore $\Delta I = \alpha E/fL$ and peak current can be seen to be inversely dependent upon the frequency of excitation and directly proportional to the duty factor, neglecting the average current established in the load. Consequently, frequency reduction increases the energy requirement of each pulse and counteracts any attempt to reduce power handling capability by frequency reduction alone. With respect to iron core inductive loads such as motors, and smoothing reactors, it is also noted that the inductive reactance of the load decreases due to flux saturation of the core as the current level increases. Accordingly, ripple currents become larger as higher average currents are maintained in the load.

In a motor drive system the applied voltage E is equal to the difference between the source voltage and the reverse voltage or counter electromotive force (CEMF) established in the motor as a function of the velocity of rotation of the armature and the magnitude of field current. Average motor current (neglecting brush drop) is equal to $(\alpha E_{DC} - E_M)/R$, where $E_{DC}$ represents source voltage, $E_M$ represents the CEMF of the motor and $R$ represents the resistance of the motor circuit. Accordingly average motor current, and thus toque, may be regulated at any desired speed by regulation of duty factor $\alpha$ so long as $E_{DC}$ is greater than $E_M$. For this reason a relatively low $\alpha$ may yield a relatively high average current at low speed while the same $\alpha$ may yield a relatively low average current at higher speeds. It is therefore apparent that duty factor $\alpha$ is indicative of motor current only if motor speed is predetermined and furthermore that $\alpha$ is not an effective variable for controlling the frequency of operation of such a chopper system in order to minimize the commutating circuit component ratings by taking advantage of the non-linearity of the motor circuit inductance and the higher permissible peak ripple currents with lower average motor currents.

In addition to the above-described considerations, some chopper controlled motors experience a unique starting problem involving the frequency of operation of the chopper. In particular it will be apparent that since the chopper commutation circuit is an oscillatory circuit, the current conducting period of the commutating circuit is determined by the values of inductive and capacitive components in the circuit. In turn, the values of these inductive and capacitive components are dictated by the characteristics of the chopper SCR, i.e., the time period during which the chopper SCR must be reverse biased in order to cause it to cease conducting. Accordingly, even if the chopper is not gated on and only the commutating circuit is operated, an average current will be established in the motor as a result of current conduction through the commutating circuit. This "commutating" current establishes a torque level in the motor such that upon turning on of the chopper circuit an excessive current may be experienced. Prior art attempts to overcome the problem of excess motor current caused by a step in motor torque due to commutation circuit current, have modified the operating frequency of the chopper and commutating circuit as a function of the commanded duty factor or percent-on-time of the chopper. Although this approach is effective to minimize motor starting lurches, it does not resolve the problem of sizing of the commutating circuit components since duty factor is not directly related to average motor current.

It is an object of the present invention to provide an improved method and apparatus for control of a chopper circuit.

It is a further object of the present invention to provide a method and apparatus for control of a chopper circuit which method and apparatus effectively reduces power handling requirements of a chopper commutation circuit.

It is a still further object of the present invention to provide an improved method and apparatus for control of a chopper circuit at multiple frequencies of operation.

SUMMARY OF THE INVENTION

In carrying out the invention in one form there is provided a control circuit for a chopper controlled DC motor wherein the control circuit is responsive to average motor currents to provide operating or gating signals to the chopper circuit at two different frequencies. During initial starting of the motor a current regulator ramps the motor current up at a predetermined rate. A current transducer senses motor current and supplies a signal proportional thereto to the control circuit. So long as motor current is below a predetermined level, gating pulses are supplied to the chopper circuit at a low frequency rate. When motor current reaches or exceeds the predetermined level, the frequency of the gating pulses is increased to a higher rate. Since ripple current decreases with increasing frequency, total peak current, which comprises ripple current plus average current, is maintained within design limits. The control circuit includes apparatus for synchronizing gating pulses to the chopper switch with the gating pulses to the chopper commutating circuit whereby the duty factor is maintained constant with changes in operating frequency.

DESCRIPTION OF THE DRAWING

For a better understanding of the present invention reference may be had to the accompanying description taken in conjunction with the following drawing in which.

DETAILED DESCRIPTION

Figure 1:
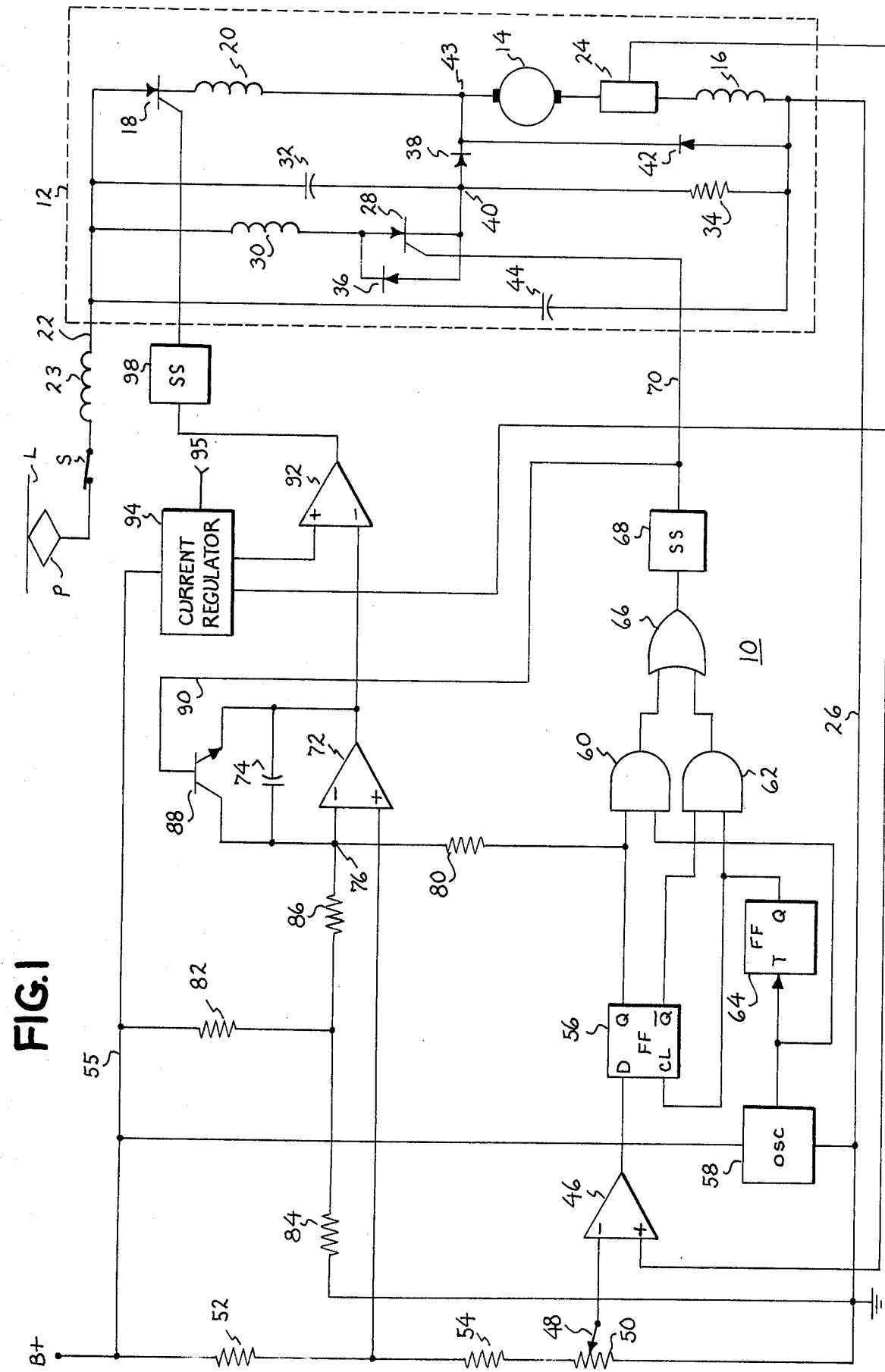
FIG. 1 is a simplified schematic/block diagram of a chopper controlled motor system and control circuit in accordance with the present invention.

Referring to FIG. 1 there is shown one embodiment of a control circuit 10 according to the present invention which circuit 10 is connected to supply control signals to a motor circuit 12. Motor circuit 12 includes a series wound DC electric motor having an armature 14 and a field winding 16. A controlled switching device, illustrated as a semiconductor controlled rectifier (SCR) 18, and a commutating reactor 20 connect one terminal of armature 14 to a DC power source L by means of a positive DC bus 22, a series filter reactor 23, a power switch S and a pantograph P. A second terminal of armature 14 is connected through a current transducer 24 to a first terminal of field winding 16, a second terminal of winding 16 being connected to a DC return or reference bus 26. Current transducer 24 may be any one of a number of well known DC current measuring devices such as, for example, a Hall effect device, a current shunt or a current measuring reactor including appropriate circuitry for transmitting a signal proportional to current.

As is well known the average current flowing through armature 14 and field winding 16 is proportional to the duty factor or percent on time of SCR 18 and the rotational velocity of the motor. Letting $T_{ON}$ equal the "on" time or conducting time of chopper 18 and $T_{OFF}$ equal the "off" time or non-conducting time, duty factor is defined as $T_{ON}/(T_{ON}+T_{OFF})$. In order to initiate the on time of SCR 18, a gate pulse is supplied to the gate terminal of SCR 18 by control circuit 10. In order to terminte the on time, a gating pulse is supplied from control circuit 10 to a gate terminal of an SCR 28 of a commutation circuit comprising a controllable switch or SCR 28, an inductor 30, a capacitor 32, a resistor 34, and diodes 36 and 38. The chopper circuit includes the commutation circuit, SCR 18 and reactor 20. Inductor 30 has a terminal connected to bus 22 and a second terminal connected to an anode of SCR 28. A cathode terminal of SCR 28 is connected to a junction 40 at an anode terminal of diode 38. A cathode terminal of diode 38 is connected to a junction 43 intermediate armature 14 and reactor 20. Capacitor 32 is connected between bus 22 and junction 40 while resistor 34 is connected between junction 40 and bus 26. Diode 36 is connected in an inverse parallel arrangement with SCR 28 with an anode of diode 36 connected to the cathode of SCR 28 and a cathode of diode 36 connected to the anode of SCR 28.

To substantially complete the motor circuit 12 there is provided a current free wheeling diode 42 connected in parallel circuit arrangement with armature 14 and field winding 16, a cathode of diode 42 being connected to a junction 43 intermediate armature 14 and reactor 20 and an anode of diode 42 being connected to bus 26. A filter capacitor 44 is connected between bus 22 and bus 26 at motor circuit 12. Since it is unnecessary to an explanation and understanding of the present invention, several elements well known in the art have been omitted from the illustrated motor circuit. In particular the elements necessary for implementation of electrical braking or for implementation of field weakening have been omitted. For a more detailed description of a DC series wound electric motor circuit reference may be had to U.S. Pat. No. 3,866,098 — Weiser, issued Feb. 11, 1975 and assigned to the General Electric Company.

Before continuing with a description of the inventive control circuit, the operation of motor circuit 12 will be described. With switch S closed, power is available at motor circuit 12 and capacitors 32 and 44 become charged. A current pulse applied to the gate terminal of SCR 18 by control circuit 10 gates SCR 18 into conduction and allows current to flow from bus 22 through SCR 18, reactor 20, motor armature 14, current transducer 24 and field winding 16 to bus 26 creating a torque and corresponding rotation of armature 14. After a predetermined time interval such as, for example, 0.001 seconds, a commutating pulse is applied to SCR 28 gating SCR 28 into conduction. Current then begins to flow in the oscillatory circuit comprising capacitor 32, inductor 30 and SCR 28. Within a relatively short time interval the voltages at junctions 40 and 43, rise to a magnitude in excess of the magnitude of the voltage on bus 22. Due to this higher voltage at junction 40 and at junction 43 a negative or reverse voltage is impressed across inductor 20 and current flow begins to transfer from SCR 18 to diode 38. Within several microseconds current has been completely transferred to diode 38 and SCR 18 has ceased conducting and is reversed biased. At the end of a time interval determined by the relative values of inductor 30 and capacitor 32, the current flowing through inductor 30 reverses direction and a current path through capacitor 32, diode 36 and inductor 30 is formed. Current flow through diode 36 reverse biases SCR 28 causing it to cease conducting. Load current to armature 14 continues to flow through capacitor 32 and diode 38 until capacitor 32 has charged to the magnitude of the voltage of source L, at which time the voltage at junction 40 is essentially equal to the voltage at bus 26. Because of the inductive reactance of motor circuit 12, current continues to flow through capacitor 32, diode 38, armature 14 and winding 16 even though capacitor 32 is charged to the voltage of source L. This action results in the voltage at junction 40 and at junction 43 falling below the voltage on bus 26. At this time current begins to transfer to the loop comprising diode 42, armature 14 and winding 16. By the time current has completely transferred to the diode 42 loop, capacitor 32 has reached an overcharged condition. This "overcharge" voltage on capacitor 32 is proportional to load current and circuit inductance and inversely proportional to the capacitance of capacitor 32. During the off-time of SCR 18, the overcharge voltage on capacitor 32 is bled off through resistor 34. After several milliseconds, depending upon the desired power output of the motor, a gating pulse is again applied to SCR 18 and the above-described cycle is repeated.

As is evident from the above discussion, the SCR 18 is periodically gated into conduction to thereby apply pulses of current to motor armature 14 and field winding 16. It is also apparent that the commutating circuit components must be capable of supplying sufficient energy to force current transfer from SCR 18 to capacitor 32, to apply a reverse bias to SCR 18 for sufficient time for SCR 18 to regain forward voltage blocking capability and still have sufficient energy remaining in capacitor 32 to cause current flow through diode 36 in order to apply a reverse bias to SCR 28 for a time sufficient for it to regain forward voltage blocking capability. If the commutating circuit is unable to supply this amount of energy, SCR 18 and/or SCR 28 will not cease conduction and a "latch-on" condition will result wherein maximum available voltage is continuously applied to the motor. Accordingly, minimization of the required commutating energy is a primary concern in chopper control systems.

In accordance with the present invention control circuit 10 is connected to supply gating signals to control the operation of SCR 18 at a frequency dependent upon average motor current. Although the illustrated embodiment demonstrates only two frequencies of operation, it will be appreciated that control circuit 10 may be readily adapted to supply a plurality of frequencies. Control circuit 10 includes a first comparator 46 having a first input terminal connected to a movable tap 48 of a potentiometer 50 and a second input terminal connector to an output terminal of current transducer 24. Potentiometer 50 constitutes one element of a voltage divider network including resistors 52 and 54. Potentiometer 50, resistor 52 and resistor 54 are connected in series circuit arrangement between a source (not shown) of regulated voltage B+ on a bus 55 and the ground reference on bus 26. Since transducer 24 provides a signal to comparator 46 representing motor current, potentiometer 50 provides a means for setting a trip point proportional to motor current for comparator 46. The trip point is selected such as to maintain the effective impedance of the motor circuit within predetermined limits, i.e., since the impedance is proportional to frequency times inductance, the frequency is increased when the inductance decreases to a predetermined level due to flux saturation of the inductive cores. Since the ripple current is directly, although not linearly, proportional to the motor circuit impedance, maintaining the impedance within limits aids in maintaining the ripple current within prescribed limits.

An output terminal of comparator 46 is connected to a D input terminal of a delay type flip-flop 56. Flip-flop 56 provides Q and inverted or Q̄ output signals from Q and Q̄ output terminals respectively. The Q output terminal is connected to a first input terminal of an AND logic gate 60 and the Q̄ output terminal is connected to a first input terminal of an AND logic gate 62. Clearly, either AND gate 60 or AND gate 62 will be enabled by flip-flop 56 depending upon the respective states of the Q and Q̄ output signals.

A second input terminal of AND gate 60 is connected to an output terminal of an oscillator 58 whereby when the Q output signal from flip-flop 56 is at a high or logic level, a signal developed at an output terminal of AND gate 60 will follow the signal from oscillator 58. A second input terminal of AND gate 62 is connected to a Q output terminal of a toggle flip-flop 64, an input terminal T of flip-flop 64 being connected to the output terminal of oscillator 58 whereby the signal developed at the Q output of flip-flop 64 is at one-half the frequency of the signal from oscillator 58 and is synchronized with the positive going leading edge of those signals. By this arrangement, when the Q output signal from flip-flop 56 is at a high or logic 1 level, AND gate 62 is enabled and produces an output signal at one-half the frequency of the signal from AND gate 60. The Q output terminal of flip-flop 64 is also connected to a clock input terminal CL of flip-flop 56 whereby the transition of the system from one frequency of operation to another is synchronized with the lowest frequency of operation to thereby assure that a frequency change occurs at the start of a cycle.

Output terminals of AND gates 60 and 62 are connected respectively to first and second input terminals of a logical OR gate 66. An output terminal of OR gate 66 is connected to an input terminal of a monostable multivibrator 68 whereby multivibrator 68 is triggered to produce an output gating signal having a predetermined time duration when a signal is received on either the first or second input terminal of OR gate 66. The output signal appearing at an output terminal of multivibrator 68 is coupled via line 70 to a gate terminal of commutating SCR 28 in order to enable the commutation circuit when it is desired to turn off SCR 18.

The circuitry for supplying gate pulses to enable chopper SCR 18 includes a ramp generator comprising an operational amplifier 72 and a capacitor 74. Amplifier 72 has a first input terminal connected to a reference voltage developed at a junction intermediate resistors 52 and 54. A second input terminal of amplifier 72 is connected to a summing junction 76. Because the illustrated embodiment operates at two different frequencies, the ramp output signal from amplifier 72 must be produced at two different ramp rates. Hence, two reference voltage signals are supplied to summing junction 76. A first reference voltage is produced by coupling the Q output terminal of flip-flop 56 to summing junction 76 by means of a current limiting resistor 80. A second reference voltage is produced by a voltage divider network comprising resistors 82 and 84 serially connected between bus 55 and bus 26. The second reference voltage appears at the junction intermediate resistors 82 and 84 and is coupled to summing junction 76 by means of current limiting resistor 86. Feedback capacitor 74 is connected between summing junction 74 and the output terminal of amplifier 72. A reset switch comprising a transistor 88 is connected in parallel with capacitor 74 to thereby provide a means for resetting the ramp voltage output of amplifier 72 when commutating SCR 28 is triggered. Actuation of transistor 88 is effected by means of a line 90 connecting the output terminal of multivibrator 68 to the gate terminal of transistor 88 whereby transistor 88 is gated into conduction at the same time as SCR 28 is gated.

Control of the firing time of SCR 18, and thus the duty factor of SCR 18, is provided by a comparator 92 which compares the ramp voltage output signal from amplifier 72 with a controllable reference voltage signal and provides a gating signal to SCR 18 when the ramp voltage signal amplitude reaches the amplitude of the reference signal. The reference signal for comparator 92 is provided by a current regulator 94 having a first input terminal connected to the output terminal of current transducer 24 and a second input terminal 95 connected to receive a current command signal from an operator's control (not shown). Regulator 94 provides a controlled rate of increase of motor current in order to minimize jerking or lurching of the motor caused by sudden current changes. Current regulator 94 may comprise any of a number of well known regulators such as, for example, the type described in U.S. Pat. No. 3,866,098 — Weiser, issued Feb. 11, 1975 and assigned to the General Electric Company. An output terminal of regulator 94 is connected to a first input terminal of comparator 92 and the output terminal of amplifier 72 is connected to a second input terminal of comparator 92. An output terminal of comparator 92 is connected to an input terminal of a monostable multivibrator 98 which multivibrator produces an output pulse of predetermined time duration when a signal on its input terminal goes from a relatively low level to a relatively high level. The output terminal of multivibrator 98 is connected to the gate terminal of chopper SCR 18 and thus provides gating signals to trigger SCR 18.

In the operation of the above-described control circuit 10, switch S is closed applying power to circuit 12. Since no current is initially flowing through armature 14 and field 16, the output of transducer 24 is at a low level forcing the output of comparator 46 to a low level as the reference voltage from potentiometer 50 exceeds the amplitude of the current feedback signal. With the output of comparator 46 at a low level, flip-flop 56 is forced into a reset condition wherein the Q output signal is at a low level and the Q output signal is at a high level. The low level Q output signal inhibits AND gate 60 while the high level Q signal enables AND gate 62. Hence, the lower frequency clock signals from toggle flip-flop 64 are passed through AND gate 62 and OR gate 66 to multivibrator 68 whereby low frequency gating signals are generated and applied to SCR 28 causing commutating current to be applied to the motor.

During this same initial period amplifier 72 produces a relatively slow rate-of-rise ramp voltage since input current to summing junction 76 is supplied through resistor 86. As the ramp voltage reaches a level determined by operator demand and current regulator 94, an output signal is produced by comparator 92, which signal triggers multivibrator 98. A gating signal is then produced by multivibrator 98 and coupled to the gate terminal of SCR 18 whereby SCR 18 is gated into condition allowing current to flow through armature 14 and field winding 16.

Synchronization between the commutation gating pulses generated by multivibrator 68 and the chopper gating pulses generated by multivibrator 98 is accomplished by resetting of amplifier 72 when multivibrator 68 is triggered. Accordingly the commutation gating pulses are coupled via line 90 to the gate terminal of transistor 88 thereby forcing transistor 88 into a conducting mode. Conduction of transistor 88 permits rapid discharge of capacitor 74 and results in a resetting to an initial condition of the ramp volage output signal of amplifier 72.

As the average current level through current transducer 24 increases due to the action of current regulator 94, the current may reach a level corresponding to that level established by potentiometer 50. Upon occurrence of this event the output signal from comparator 46 switches to a high level thereby allowing flip-flop 56 to be gated into a set condition by the next occurring clock pulse from flip-flop 64. With flip-flop 56 in a set condition, the Q output terminal is at a high or logic 1 level and the Q output terminal is at a low or logic 0 level. The respective Q and Q output signals enable AND gate 60 and inhibit AND gate 62. Accordingly, trigger pulses are now applied to multivibrator 68 at the higher clock frequency thus providing gating pulses to SCR 28 at the higher frequency. For this higher frequency operation the Q output signal is also applied through resistor 80 to summing junction 76 to thereby increase the voltage level at junction 76 and permit a more rapid integration and a faster rate-of-rise of the ramp output signal from amplifier 72.

In this manner it can be seen that the frequency of operation of the commutation circuit for SCR 18 is made a function of average current levels in armature 14 and field winding 16. As has been shown the ripple current in the motor circuit decreases with increased frequency of operation and therefore the total peak-to-peak motor current is stabilized by reducing the ripple current through frequency increases when the average current reaches a predetermined level. Conversely, when average motor current is low the ripple current is permitted to increase by appropriate frequency reduction and the total peak-to-peak current remains within permissible limits. Ripple currents are additionally attenuated at low average current levels by the increased inductance of the motor circuit, i.e., the flux level in the iron core inductance of the circuit is relatively low so that the cores are not saturated. As the average current increases and creates a corresponding increase in the core flux levels, the circuit inductance is reduced; however, the increase in operating frequency at higher average current levels results in a reduction in peak ripple currents so that the total motor current stays within predetermined limits. In addition, the low frequency operation of motor circuit 12 during initial start-up of the motor avoids lurching since the average current contributed by the commutation circuit alone is at a lower level.

Although the illustrated embodiment has shown the use of a current feedback signal from transducer 24 being utilized to set the frequency of the system, it will be apparent that the current command signal from current regulator 94 could likewise be utilized. In some applications, for example where large current spikes occur in the motor circuit, the use of the relatively stable current command signal from regulator 94 may be required in order to prevent undesired switching between the frequencies of operation. It is noted that in the typical control system of the type described herein that the current command signal from regulator 94 and the current feedback signal from transducer 24 are essentially identical, ignoring the occasional transient current spikes in the motor circuit. Furthermore, it will be apparent to those skilled in the art that the current transducer 24 may be adapted to read either average or peak currents and that either of these parameters may be utilized by appropriate setting of the trip point of comparator 46 by means of poentiometer 50.

While the principles of the invention have now been made clear in an illustrated embodiment there will be immediately obvious to those skilled in the art many modifications, constructions and arrangements used in the practice of the invention which are particularly adapted for specific environments and operating requirements without departing from those principles. The appended claims are therefore intended to cover and embrace any such modifications, subject only to the limits of the true spirit and scope of the invention.

What I claim as new and desire to secure by Letters Patent of the United States is:

1. A frequency control system for a chopper circuit including controllable switching means for metering power from a DC source to a DC load, said control system comprising:
   a. gating control for controlling the duty factor of the switching means as a function of a current command signal, said gating control means being connected to supply periodic ON and OFF commands to the chopper circuit at a controlled repetition rate for controlling said duty factor;
   b. means for generating a first signal representative of current in the load; and
   c. means coupling said first signal to said gating control means, said gating control means being responsive to said first signal to change the repetition rate of said periodic ON and OFF commands as a function of said first signal.

2. The invention as defined in claim 1 wherein said gating control means supplies said periodic ON and OFF commands at a first frequency when said first signal level is below a predetermined amplitude at a second frequency when said first signal level equals and exceeds said predetermined amplitude.

3. The invention as defined in claim 1 and including means for maintaining said duty factor independent of the repetition rate of said periodic ON and OFF commands.

4. The invention as defined in claim 1 wherein said repetition rate is varied at discrete increments of the magnitude of said load current.

5. The invention as defined in claim 4 wherein said discrete increments are selected to maintain the effective inpedance of said load within predetermined limits.

6. A frequency control system for a chopper circuit includng controllable switching means for metering power from a DC source to a DC motor armature, said control system comprising:
   a. means for cyclically turning on the controllable switching means at a controlled frequency;
   b. means for turning off the controllable switching means after the conrollable switching means has been on for a variable percentage of a cycle of said controlled frequency;
   c. means for varying said percentage as a function of a command signal;
   d. means for generating a motor current signal representative of current in the motor armature; and
   e. means for controlling said frequency as a function of said motor current signal and independently of said percentage.

7. The invention as defined in claim 6 wherein said frequency is maintained at a first low value when said motor current signal is less than a predetermined magnitude and at a second higher value when said motor current signal equals or exceeds said predetermined magnitude.

8. The invention as defined in claim 6 and including means for comparing said motor current signal to said command signal and for varying said percentage in a manner to minimize any difference between said motor current signal and said command signal.

9. A method for independently controlling the frequency and the duty factor of a thyristor chopper circuit including a main thyristor adapted for metering power from a DC source to a DC motor armature. said method comprising the steps of:

a. cyclically turning on the thyristor at a controlled frequency;

b. turning off the thyristor after the thyristor has been on for a variable percentage of a cycle of said predetermined frequency;

c. generating a current signal representative of current in the motor armature;

d. comparing said current signal to a current command signal;

e. varying said percentage in a manner to minimize any difference between said current signal and said current command signal; and f. changing said frequency as a function of the magnitude of said current signal independently of said percentage.

* * * * *